United States Patent Office 3,442,982
Patented May 6, 1969

3,442,982
POLYPHOSPHITES OF 2,2-DIMETHYL-3-HYDROXYPROPYL - 2 - DIMETHYL - 3-HYDROXYPROPIONATE
Lester Friedman, Beachwood, Ohio, assignor to Weston Chemical Corporation, Newark, N.J., a corporation of New Jersey
No Drawing. Filed Oct. 15, 1965, Ser. No. 496,718
Int. Cl. C08g *33/16;* C07d *105/02*
U.S. Cl. 260—927          13 Claims

ABSTRACT OF THE DISCLOSURE

Polymers are prepared having the formula:

(a)
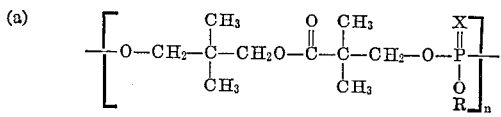

or (b)
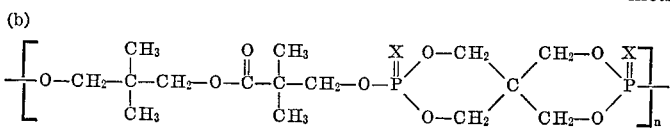

or (c) the polymeric reaction product of Ester diol 204, a phosphite having the formula

and a dihydric phenol, hydrogenated dihydric phenol or other dihydric phenol, $n$ is an integer greater than 1, X is oxygen, sulfur or nothing, R is alkyl, aryl or haloaryl.

---

The present invention relates to novel phosphite polymers.

It is an object of the present invention to prepare phosphite polymers which are stable to hydrolysis, heat and light.

Another object is to prepare stabilized polyesters, polyolefins and vinyl chloride resins.

A further object is to prepare novel phosphates and thiophosphates.

Still further objects and the entire scope of applicability of the present invention will become apparent from the detailed description given hereinafter. It should be understood, however, that the detailed description and specific examples, while indicating preferred embodiments of the invention are given by way of illustration only, since various changes and modifications within the spirit and scope of the invention will become apparent to those skilled in the art from this detailed description.

It has now been found that these objects can be obtained by preparing novel phosphite polymers having one of the repeating units

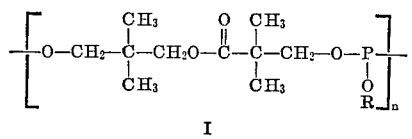

I

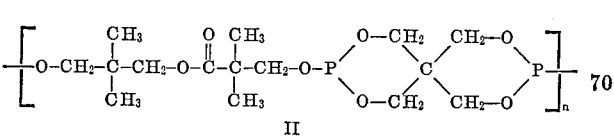

II and III, the polymeric reaction product of Ester diol 204, a phosphite having the formula

and a dihydric phenol, hydrogenated dihydric phenol or other dihydric phenol, where $n$ is an integer greater than one, R is alkyl, aryl, or haloaryl and $R_1$ is the residue of a dihydric phenol or hydrogenated dihydric phenol from which the two hydroxyl groups have been removed. Preferably $R_1$ is the residue of bisphenol A (4,4'-dihydroxydiphenyl propane) or of hydrogenated bisphenol A.

The compounds having repeating unit I are prepared by transesterifying 2,2-dimethyl-3-hydroxypropyl-2,2-dimethyl-3-hydroxypropionate (for convenience, hereinafter referred to as "neocarboxylate") with a compound having the formula

where the R's are the same or different and R is as defined above.

To make high molecular weight polymers the two reactants are used in equimolar amount. If excess of the neocarboxylate is used, e.g., 1.2 moles per mole of the tertiary phosphite then the molecular weight of the polymer is lowered and gelling occurs. Similarly, if an excess of the tertiary phosphite is used, e.g., there is used 0.8 mole of the neocarboxylate to 1 mole of tertiary phosphite then the molecular weight of the polymer is again lowered. While the reactants can thus be used in the range from 0.8:1 up to 1.2:1, preferably they are employed in substantially equimolar proportions to prepare the polymers having unit I.

The compounds having repeating unit II can be prepared in several ways.

Thus there can be reacted 1 mole of Ester diol 204 with 1 mole of a dihydrocarbyl pentaerythritol diphosphite, e.g., diphenyl pentaerythrityl diphophite and diisodecyl pentaerythrityl diphosphite, or alternatively there can be reacted 1 mole of neocarboxylate with a mixture of 2 moles of a phosphite having the formula

e.g., triphenyl phosphite, tris decyl phosphite or the like, and 1 mole of pentaerythritol.

The mole ratio of the neocarboxylate to dihydrocarbyl pentaerythritol diphosphite can vary from 0.3:1 to 1.7:1. For the highest molecular weight polymers preferably there are used 1 mole of neocarboxylate to 1 mole of diphosphite.

The compounds of type III can be prepared by reacting 1 mole of neocarboxylate with a mixture of 2 moles of a phosphite having the formula

and 1 mole of a dihydric phenol or hydrogenated dihydric phenol or other dihydric alcohol. The mole ratio of neocarboxylate to bisphenol A or the like can vary from 0.3:1 to 1.7:1. Preferably a mole ratio of about 1:1 is employed in order to make the highest molecular weight polymer. The amount of tertiary phosphite can be varied from 1.6 to 2.4 moles per mole of dihydric phenol but is preferably 2 moles per mole of the dihydric phenol.

The phosphates of the present invention can be prepared by oxidizing the corresponding phosphites with air or controlled oxidation with hydrogen peroxide. The thiophosphates can be prepared by treating the corresponding phosphites with sulfur.

Examples of tertiary phosphites having the formula

which can be used in the present invention are alkyl, aryl and haloaryl phosphites such as trimethyl phosphite, triethyl phosphite, tripropyl phosphite, triamyl phosphite, tris octyl phosphite, tris isooctyl phosphite, tris decyl phosphite, tris isodecyl phosphite, tris octadecyl phosphite, tris dodecyl phosphite, triphenyl phosphite, tri-o-cresyl phosphite, tri-p-cresyl phosphite, tri-m-cresyl phosphite, tri-xylenyl phosphite, tri(ethylphenyl) phosphite, tri(o-butylphenyl) phosphite, tri(p-t-butylphenyl) phosphite, tri (p-octylphenyl) phosphite, tri (p-nonphenyl) phosphite, tri(p-dodecylphenyl) phosphite, tri-α-naphthyl phosphite, phenyl diisodecyl phosphite, diphenyl decyl phosphite, m-cresyl di octyl phosphite, o-cresyl dioctadecyl phosphite, di p-cresyl hexyl phosphite, diphenyl pentachlorophenyl phosphite, diphenyl 2,4,6-trichlorophenyl phosphite, tri-p-chlorophenyl phosphite, tri-o-chlorophenyl phosphite, tri (-2,4-dichlorophenyl) phosphite, tri-(2,4,5-tri-chlorophenyl) phosphite, tri-(2,4,6-trichlorophenyl) phosphite, tri-p-bromophenyl phosphite.

As the dihydric phenol or dihydric alcohol there preferably are used materials having at least four atoms in the chain separating the OH groups, e.g., diethylene glycol, dipropylene glycol, tri- and polypropylene glycols, decamethylene glycol, hexamethylene glycol, triethylene glycol, thiodiglycol, sulfonyl diglycol, pentamethylene glycol, 1,4 - cyclohexanedimethanol, tetrachloro - 1,4 - butanediol, dibromo 1,4-butenediol, xylylene glycol, 4,4'-isopropylidene dicyclohexanol (hydrogenated bisphenol A), bisphenol A and other (di hydroxyaryl) alkylidenes such as di (4-hydroxy-3-methylphenyl) dimethyl methane, di (4-hydroxy-3-methylphenyl) methyl methane, di (p-hydroxyphenyl) methyl ethyl methane, di (4-hydroxy -3-methylphenyl) phenyl methane, di (4-hydroxyphenyl) methane, di (4-hydroxyphenyl) sulfone, di (hydroxyphenyl) sulfide, hydroquinone, di (4-hydroxyphenyl) sulfoxide, di (3-hydroxyphenyl) dimethyl methane, tetrabromo bisphenol A, tetrachloro bisphenol A, 4,4'-methylene bis (2-methyl-6-t-butylphenol), di (4-hydroxyphenyl) ether, di (3-chloro-4-hydroxyphenyl) dimethyl methane, and dihydroxydiphenyl.

The phosphites of the present invention are normally prepared in the presence of a dihydrocarbyl or dihaloaryl phosphite or an alkaline catalyst in an amount of 0.05–5% by weight of the phosphite reactant or reactants, e.g., triphenyl phosphite.

Examples of suitable catalysts are dialkyl or diaryl or dihaloaryl phosphites such as diphenyl phosphite, di-o-cresyl phosphite, di-p-cresyl phosphite, di decyl phosphite, diisodecyl phosphite, dioctadecyl phosphite, dimethyl phosphite, diethyl phosphite, di-o-chlorophenyl phosphite, di-2,4-dichlorophenyl phosphite or alkaline catalysts such as sodium phenolate, sodium methylate, sodium cresylate, potassium phenolate, sodium isodecylate. The alkyline catalysts preferably have a pH of at least 11 in an 0.1 N solution.

The phosphites of the present invention are remarkably stable toward hydrolysis, heat and light.

All of the phosphites of the present invention are useful in imparting stability against light and polymer degradation to polyvinyl chloride and other vinyl chloride polymers, e.g., vinyl chloride, vinylidene chloride copolymer (80:20), vinyl chloride-vinyl acetate (87:13). They also are stabilizers for monoolefin polymers such as polyethylene, polypropylene, ethylene-propylene copolymers (e.g., 50:50, 80:20 and 20:80), ethylene-monoolefin copolymers wherein the monoolefin has 4–10 carbon atoms and is present in a minor amount, e.g., ethylene-butene-1 copolymer (e.g., 95:5) and ethylene decene-1 copolymer. Furthermore, they can be used to stabilize natural rubber, styrene-butadiene rubber (SBR rubber) ethylene-propylene-nonconjugated diene terpolymers, e.g., ethylene - propylene - dicyclopentadiene (e.g., 57:42:3), polybutadiene and poly cis isoprene. Also, they are stabilizers for polyesters, e.g., styrene modified diethylene glycol adipate-maleate. The compounds of the present invention are normally employed in an amount of 0.25 to 10% by weight of the polymer they are intended to stabilize. They are particularly good as thermal stabilizers.

Unless otherwise indicated, all parts and percentages are by weight.

The polymeric phosphates and thiophosphates of the present invention are useful as plasticizers for vinyl chloride resins and cellulose esters. They are also suitable for imparting flame resistance to polyurethanes and polyesters. The polymeric phosphites of the present invention also are useful to impart flame resistance to polyurethanes and polyesters.

Examples of polymeric phosphites containing repeating unit I are poly (phenyl neocarboxylate phosphite), poly (p-cresyl neocarboxylate phosphite), poly (t-butylphenyl neocarboxylate phosphite), poly (p-nonylphenyl neocarboxylate phosphite), poly (isodecyl neocarboxylate phosphite), poly (methyl neocarboxylate phosphite), poly (2,4,5-trichlorophenyl neocarboxylate phosphite), poly (pentachlorophenyl neocarboxylate phosphite), poly (α-naphthyl neocarboxylate phosphite), poly (octadecyl neocarboxylate phosphite), poly (2,4-xylenyl neocarboxylate phosphite).

Examples of polymeric phosphite of type III are poly (diphenyl bisphenol A neocarboxylate diphosphite), poly (diphenyl hydrogenated bisphenol A neocarboxylate diphosphite), poly (diisodecyl bisphenol A neocarboxylate diphosphite), poly (diisodecyl hydrogenated bisphenol A neocarboxylate diphosphite), poly (di-p-cresyl bisphenol A neocarboxylate diphosphite), poly (di-p-nonylphenyl bisphenol A neocarboxylate diphosphite, poly (di-p-dodecylphenyl hydrogenated bisphenol A neocarboxylate diphosphite), poly [di(2,4,6-trichlorophenyl) bisphenol A neocarboxylate diphosphite], poly [di(pentachlorophenyl) hydrogenated bisphenol A diphosphite], poly (diphenyl dipropylene glycol neocarboxylate diphosphite), poly (diphenyl cyclohexanedimethanol neocarboxylate diphosphite), poly (diphenyl dihydroxydiphenyl neocarboxylate diphosphite).

Examples of polymeric phosphates and thiophosphates within the present invention are poly (phenyl neocarboxylate phosphate), poly (phenyl neocarboxylate thiophosphate), poly (decyl neocarboxylate phosphate), poly (isodecyl neocarboxylate thiophosphate), poly (p-nonylphenyl neocarboxylate phosphate), poly (pentaerythrityl neocarboxylate diphosphate), poly (pentaerythrityl neocarboxylate dithiophosphate), poly (diphenyl bisphenol A neocarboxylate diphosphate), poly (diphenyl bisphenol A neocarboxylate dithiophosphate), poly (diphenyl hydrogenated bisphenol A neocarboxylate diphosphate), poly (diphenyl hydrogenated bisphenol A neocarboxylate dithiophosphate), poly (dioctyl bisphenol A neocarboxylate diphosphate), poly (didecyl hydrogenated bisphenol A neocarboxylate dithiophosphate).

EXAMPLE 1

Poly (phenyl neocarboxylate phosphite)

310 grams (1 mole) of triphenyl phosphite, 204 grams (1 mole) of neocarboxylate and 5 grams of diphenyl phosphite were heated in vacuo at 120–150° C. and the phenol formed was removed by distillation. The residue solidified to a brittle, clean, colorless solid which softened at about 110° C. It was poly (phenyl neocarboxylate phosphite). Expose of the product to atmospheric moisture did not effect it adversely in any way.

The solid phosphite polymers of the present invention, e.g., that of Example 1, are compatible with polymeric systems and are especially useful in stabilizing rigid polymers, e.g., rigid polyvinyl chloride. The use of a solid stabilizer simplifies melting and mixing operations and facilitates the handling and shipping of the solid polymer.

EXAMPLE 2

The procedure of Example 1 was repeated but using only 0.8 mole of triphenyl phosphite with the 1 mole of neocarboxylate to produce a lower molecular weight polymer having a lower softening point.

Similarly when Example 1 was repeated using 1,2 moles of neocarboxylate with 1 mole of triphenyl phosphite the polymer produced had a lower molecular weight and lower softening point.

EXAMPLE 3

Poly (t-butylphenyl neocarboxylate phosphite)

The procedure of Example 1 was repeated using 1 mole of triphenyl phosphite, 1 mole of p-t-butylphenyl and 1 mole of neocarboxylate with 5 grams of diphenyl phosphite as the catalyst. The condensation was continued until 3 moles of phenol were removed. The solid residue was a high polymer having pendant t-butylphenyl groups. The product was poly (p-t-butylphenyl neocarboxylate phosphite). It had a higher softening point than the product of Example 1.

EXAMPLE 4

By replacing the p-t-butylphenol in Example 3 by 1 mole of p-nonyphenol there was produced poly (p-nonylphenyl neocarboxylate phosphite). In similar fashion by using 1 mole of p-octylphenol there was produced poly (p-octylphenyl neocarboxylate phosphite).

EXAMPLE 5

Example 1 was repeated replacing the triphenyl phosphite by 1 mole of diphenyl 2,4,5-trichlorophenyl phosphite to produce as the solid residue poly (2,4,5-trichlorophenyl neocarboxylate phosphite).

EXAMPLE 6

Example 1 was repeated replacing the triphenyl phosphite by 1 mole of tris decyl phosphite to produce as the solid residue poly (decyl neocarboxylate phosphite).

EXAMPLE 7

Poly (pentaerythrityl neocarboxylate diphosphite)

1 mole of neocarboxylate was condensed with 1 mole of diphenyl pentaerythritol diphosphite in the presense of 5 grams of diphenyl phosphite as the catalyst and the phenol formed removed by heating and distillation in vacuo. After removal of 2 moles of phenol there was formed as the residue poly (pentaerythrityl neocarboxylate disphosphite) as a highly viscous polymer which solidified at about 160° C. to give a clear tough, colorless solid. The liquid polymer was also formed into fibers which on cooling became somewhat friable. This polymer was extremely temperature stable, but had a poorer resistance to hydrolysis than the polymers produced in Examples 1 and 3.

EXAMPLE 8

The same product as that of Example 7 was formed by condensing 1 mole of neocarboxylate with 2 moles of triphenyl phosphite and 1 mole of pentaerythritol.

EXAMPLE 9

The procedure of Example 7 was repeated but using only 0.8 mole of the neocarboxylate with 1 mole of diphenyl pentaerythritol diphosphite to produce a lower molecular weight polymer having a lower softening point.

Similarly when Example 7 was repeated using 1.2 moles of neocarboxylate with 1 mole of diphenyl pentaerythritol diphosphite the polymer produced had a lower molecular weight and lower softening point.

EXAMPLE 10

1 mole of neocarboxylate was condensed with a mixture of two moles of triphenyl phosphite and 1 mole of Bisphenol A in the presence of 5 grams of diphenyl phosphite and the phenol formed removed by heating and distillation in vacuum. After removal of 4 moles of phenol, there was formed as the residue in the pot poly (diphenyl bisphenol neocarboxylate diphosphite).

EXAMPLE 11

The procedure of Example 10 was repeated replacing the triphenyl phosphite by two moles of tris decyl phosphite and the decyl alcohol formed removed by heating and distillation in vacuum until 4 moles of decyl alcohol were removed. There was formed as the residue in the pot poly (didecyl bisphenol A neocarboxylate diphosphite).

EXAMPLE 12

The procedure of Example 10 was repeated replacing the bisphenol A by 1 mole of hydrognated bisphenol A to produce poly (diphenyl hydrogenated bisphenol A neocarboxylate diphosphite) as the residue in the pot.

EXAMPLE 13

The procedure of Example 10 was repeated replacing the bisphenol A by 1 mole of hydrogenated bisphenol A and by replacing the triphenyl phosphite by 2 moles of tris isodecyl phosphite to produce poly (tris isodecyl hydrogenated bisphenol A neocarboxylate diphosphite) as the residue in the pot.

EXAMPLE 14

Hydrogen peroxide was carefully passed into the poly (phenyl neocarboxylate phosphite) formed in Example 1 at a temperature of about 125° C., to form poly (phenyl neocarboxylate phosphate).

EXAMPLE 15

The stoichiometric amount of sulfur was added to poly (phenyl neocarboxylate phosphite) and the mixture heated to 130° C. to form poly (phenyl Neo Carboxylate thiophosphate).

It should be noted that the polymeric phosphites and the like of the present invention are made from a dihydroxy compound having no beta hydrogen to the hydroxyl groups and this may account for the unusual stability of the polymeric phosphites.

In the high molecular weight polymers $n$ in Formulas I, II and III can be large, e.g., 10, 20, 50, 200 or more.

What is claimed is:
1. A solid polymer which is (a) a compound consisting essentially of units of the formula

$$\left[ -OCH_2 - \underset{\underset{CH_3}{|}}{\overset{\overset{CH_3}{|}}{C}} - CH_2O - \overset{\overset{O}{\|}}{C} - \underset{\underset{CH_3}{|}}{\overset{\overset{CH_3}{|}}{C}}H_2 - O - \underset{\underset{R}{|}}{\overset{\overset{}{}}{P}} - \right]$$

or (b) a compound consisting essentially of units of the formula

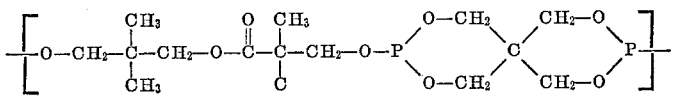

or (c) a phosphite consisting essentially of the reaction product of 1 mole of a dihydric compound which is a dihydric phenol or dihydric alcohol with 1 mole of 2,2-dimethyl - 3-hydroxypropyl-2,2-dimethyl-3-hydroxypropionate and 2 moles of a tertiary phosphite having the formula $(RO)_3P$ where R is allkyl, aryl or haloaryl.

2. A polymer according to claim 1 consisting essentially of the repeating units

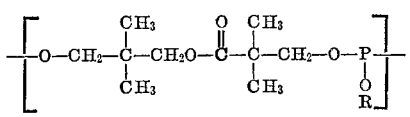

3. A compound according to claim 2 where R is alkyl.
4. A compound according to claim 2 where R is aryl of the phenyl series.
5. A compound according to claim 2 where R is chloroaryl.
6. A compound according to claim 1 which is poly(phenyl neocarboxylate phosphite).
7. A compound according to claim 1 which is poly(alkylphenyl neocarboxylate phosphite).
8. A compound according to claim 1 which is (c).
9. A compound according to claim 8 wherein R is alkyl and the dihydric compound is 2,2-bis(4-hydroxyphenyl) propane.
10. A compound according to claim 8 wherein R is aryl of the phenyl series and the dihydric compound is 4,4'-2,2-bis(4-hydroxyphenyl) propane.
11. A compound according to claim 8 wherein R is alkyl and the dihydric compound is 4,4'-isopropylidene isopropylidene dicyclohexanol.
12. A compound according to claim 8 wherein R is alkyl and the dihydric compound is 4,4'-isopropylidene dicyclohexanol.
13. A compound according to claim 1 consisting essentially of the repeating units

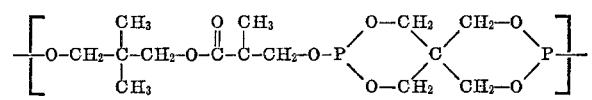

References Cited

UNITED STATES PATENTS

| | | | |
|---|---|---|---|
| 2,952,666 | 9/1960 | Coover et al. | 260—77.5 |
| 3,047,608 | 7/1962 | Friedman et al. | 260—461 |
| 3,341,629 | 9/1967 | Larrison | 260—928 |
| 3,378,524 | 4/1968 | Larrison | 260—47 |

FOREIGN PATENTS

| | | |
|---|---|---|
| 978,285 | 12/1964 | Great Britain. |
| 1,332,901 | 7/1963 | France. |

WILLIAM H. SHORT, *Primary Examiner.*

M. GOLDSTEIN, *Assistant Examiner.*

U.S. Cl. X.R.

106—176, 177; 260—2, 3, 13, 30.6, 45.8, 45.85, 47, 78.3, 858, 860, 887, 896, 897, 899, 928, 930